United States Patent
Campbell

(10) Patent No.: US 6,594,750 B1
(45) Date of Patent: Jul. 15, 2003

(54) METHOD AND APPARATUS FOR HANDLING AN ACCESSED BIT IN A PAGE TABLE ENTRY

(75) Inventor: Paul Campbell, Oakland, CA (US)

(73) Assignee: ATI International SrL, Barbados (KN)

( * ) Notice: Subject to any disclaimer, the term of this patent is extended or adjusted under 35 U.S.C. 154(b) by 0 days.

(21) Appl. No.: 09/456,624

(22) Filed: Dec. 8, 1999

(51) Int. Cl.$^7$ .............................. G06F 12/00
(52) U.S. Cl. .................. 711/207; 711/210; 712/233
(58) Field of Search ................. 711/205, 206, 711/207, 208, 209, 210; 712/233, 234, 238, 242, 243, 244

(56) References Cited

U.S. PATENT DOCUMENTS

| | | | | |
|---|---|---|---|---|
| 5,832,205 A | * | 11/1998 | Kelly et al. ............... | 714/53 |
| 5,873,123 A | * | 2/1999 | Patel et al. .............. | 711/202 |
| 6,003,123 A | * | 12/1999 | Carter et al. ............ | 711/207 |
| 6,038,631 A | * | 3/2000 | Suzuki et al. ........... | 710/260 |
| 6,101,590 A | * | 8/2000 | Hansen ................... | 711/203 |
| 6,199,152 B1 | * | 3/2001 | Kelly et al. ............. | 711/207 |
| 6,378,067 B1 | * | 4/2002 | Golliver et al. ......... | 712/244 |

* cited by examiner

Primary Examiner—Do Hyun Yoo
Assistant Examiner—C. P. Chace
(74) Attorney, Agent, or Firm—Vedder, Price, Kaufman & Kammholz

(57) ABSTRACT

A method and apparatus for handling an accessed bit in a page table entry is provided. When a page table entry is not present in a translation lookaside buffer (TLB), an electrical circuit causes a TLB miss exception and branching to a first software exception handler. The first software exception handler fetches the page table entry from main memory. The first software exception handler places the page table entry in the TLB. An electrical circuit determines whether an accessed bit of the page table entry has not been asserted. If the accessed bit is not asserted, an electrical circuit causes an accessed bit exception and branches execution to a second software exception handler. The second software exception handler asserts the accessed bit in the page table entry in main memory. The second software exception handler returns control back to the original memory access, causing execution to resume where it had left off prior to the TLB miss exception. This process may be practiced for an upper-level page table entry or a lower level page table entry.

17 Claims, 3 Drawing Sheets

METHOD AND APPARATUS FOR HANDLING AN ACCESSED BIT IN A PAGE TABLE ENTRY

TECHNICAL FIELD OF THE INVENTION

The invention relates generally to virtual memory translation caching in a computer system and more specifically to handling an accessed bit in a page table entry.

BACKGROUND OF THE INVENTION

In a computer system, instructions and data are stored in a memory device until they are needed. The memory device is organized according to an addressing scheme to allow the instructions and data to be located by specifying an address. However, while the memory device is organized into a plurality of physical addresses, it is often useful for a processor to consider the instructions and data to be organized according to a different addressing scheme, denoted by virtual addresses. The virtual addresses may be converted to physical addresses to allow the instructions and data to be accessed in the memory device.

A translation lookaside buffer (TLB) structure may be used to provide a cache for translation of virtual addresses to physical addresses. The TLB structure includes a plurality of upper-level page tables, also referred to as page directories, that contain upper-level page table entries, also referred to as page directory entries. The TLB structure also includes a plurality of lower-level page tables that contain lower-level page table entries. The upper-level page table entries serve as pointers to the plurality of lower-level page tables and the lower-level page table entries serve as pointers to pages of data in the memory device.

FIG. 1 is a block diagram illustrating the relationship between a processor, a TLB structure, and memory. Processor 101 is coupled to and communicates in virtual addresses with TLB structure 102. TLB structure 102 is coupled to and communicates in physical addresses with main memory 103. Alternatively, processor 101 may communicate directly with main memory 103.

A virtual memory system makes it possible to generate addresses for address space in excess of that actually supported by physical memory devices. In such a virtual memory system, virtual memory pages are loaded into available physical memory devices as memory accesses are made to memory locations within those virtual memory pages. Other virtual memory pages that are no longer needed are written to a larger, but often slower, storage device, for example a hard disk drive. To manage the paging of such a virtual memory system, certain indications about the status of the virtual memory system are provided.

If changes are made that affect the TLB structure 102, a "dirty" indication is provided to processor 101 so that processor 101 can maintain consistency between the TLB structure 102 and the main memory 103. An "accessed" indication is used by the operating system running on processor 101 to check memory usage. The "accessed" indication indicates a recent memory access. An electrical circuit provides the "accessed" indication, for example by asserting an "accessed" bit for an accessed page table entry in memory page tables from which the TLB structure 102 is loaded. Upon the first access to that accessed page table entry, the accessed bit is set and written back into main memory. "Accessed" indications can be used, for example, to implement a least-recently-used (LRU) replacement strategy for main memory pages.

The operating system running on processor 101 identifies accessed page table entries based on the "accessed" indications and resets the "accessed" indications, for example by deasserting the "accessed" bits. In the prior art, electrical circuits were provided to handle the assertion and deassertion of "accessed" indications. However, such electrical circuits occupy substantial space on an integrated circuit die. As the complexity of integrated circuits used in computers has increased, the amount of space on an integrated circuit die for such electrical circuits can no longer be afforded, as that space is now needed for other circuitry. Thus, the use of electrical circuits to handle the assertion and deassertion of "accessed" indications is no longer feasible.

Thus, a method and apparatus is needed to allow efficient handling of an accessed bit in a page table entry.

DETAILED DESCRIPTION OF A PREFERRED EMBODIMENT

A method and apparatus for handling an accessed bit in a page table entry is provided. The accessed bit is handled efficiently by minimizing the amount of electrical circuitry while also minimizing the time required for software processing operations related to the accessed bit.

Figure 1:
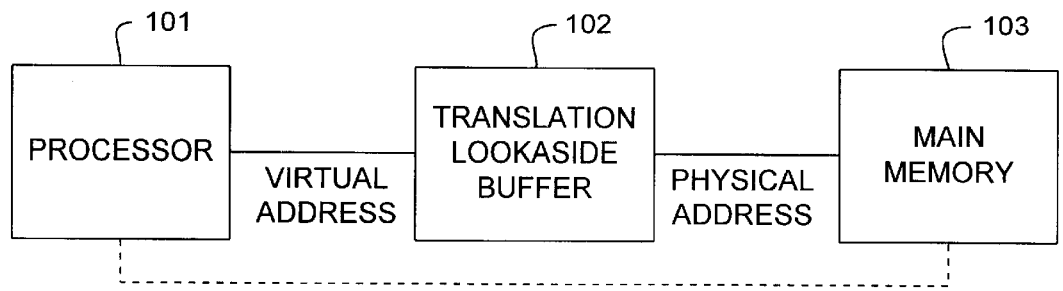
FIG. 1 is a block diagram illustrating the relationship between a processor, a translation lookaside buffer structure, and main memory.
Figure 2:
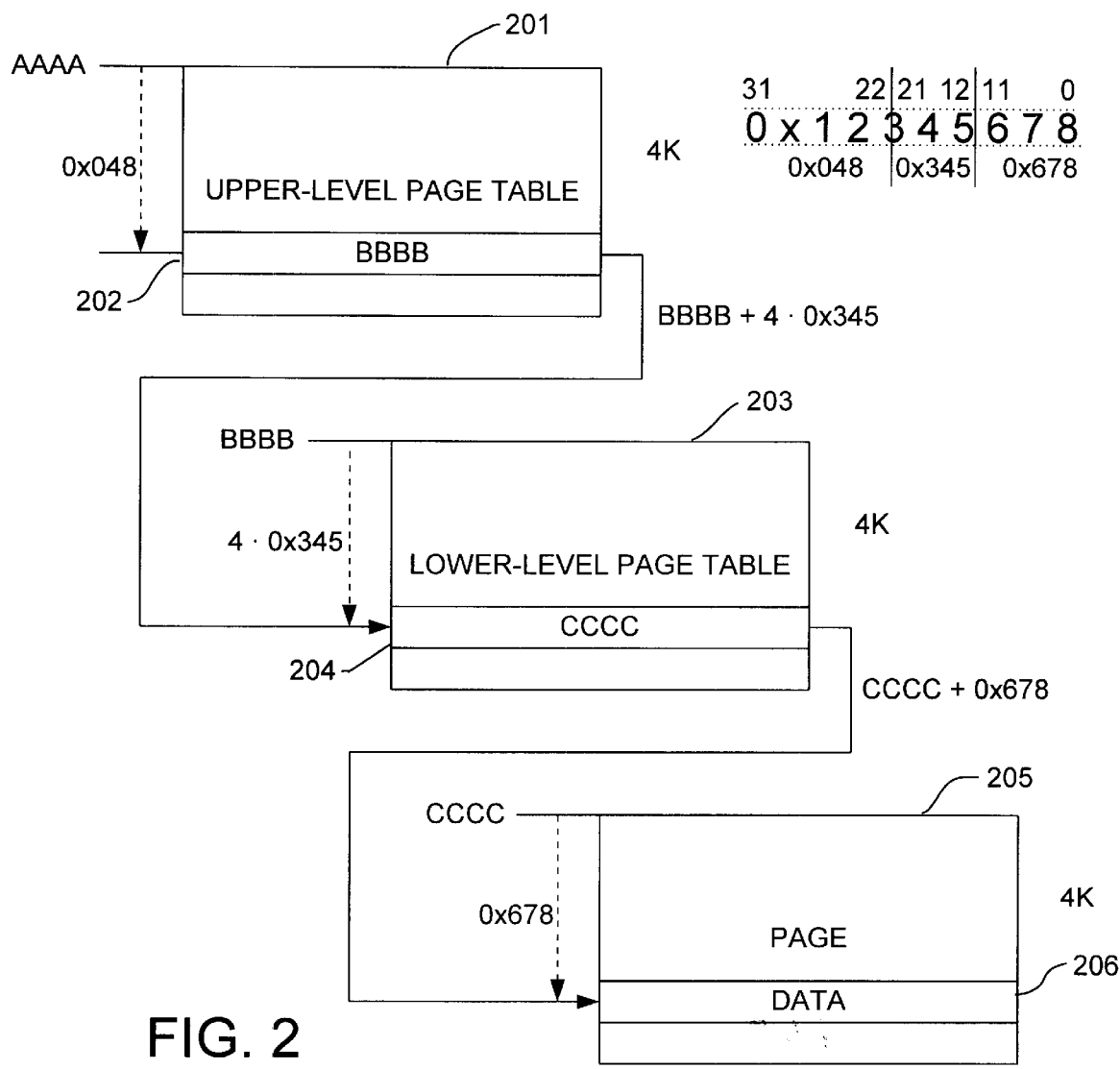
FIG. 2 is a block diagram illustrating an example of a translation lookaside buffer structure.

FIG. 2 is a block diagram illustrating an example of a translation lookaside buffer structure. The example shows the use of a TLB structure for accessing a cached translation of the 32-bit virtual address represented in hexadecimal as 0x12345678. The virtual address is divided into three parts. The first part comprises the most significant ten bits (bits 22–31). Since ten bits is not divisible into an integer number of hexadecimal digits, the boundaries between the hexadecimal digits change, giving the hexadecimal representation 0x048. The second part comprises ten bits (bits 12–21) of lesser significance than the ten most significant bits, but contiguous with the ten most significant bits. While these ten bits are also not divisible into an integer number of hexadecimal digits, since only the two most significant bits are truncated from the most significant hexadecimal digit of the second part, the hexadecimal representation of the second part remains 0x345. The third part comprises the twelve least significant bits (bits 0–11). Since these twelve bits are divisible into three hexadecimal digits, the hexadecimal representation for these twelve bits remains 0x678.

Upper-level page table 201 begins at address AAAA. Applying the first part of the virtual address, denoted as 0x048, as an offset within upper-level page table 201 yields an address AAAA+0x048 containing value BBBB. Value BBBB identifies the beginning of lower-level page table 203. Applying four times the second part of the virtual address (i.e., the second part of the virtual address shifted to the left twice), denoted as 4·0x345, as an offset within lower-level page table 203 yields address BBBB+4·0x345 containing value CCCC. Value CCCC identifies the beginning of page 205. Applying the third part of the virtual address, denoted as 0x678, as an offset within page 205 yields address CCCC+0x678 containing data 206. Data 206 is the data stored at the physical address in the memory device that corresponds to the virtual address 0x12345678. Thus, the TLB structure provides caching of virtual address-to-physical address translations.

Figure 3:
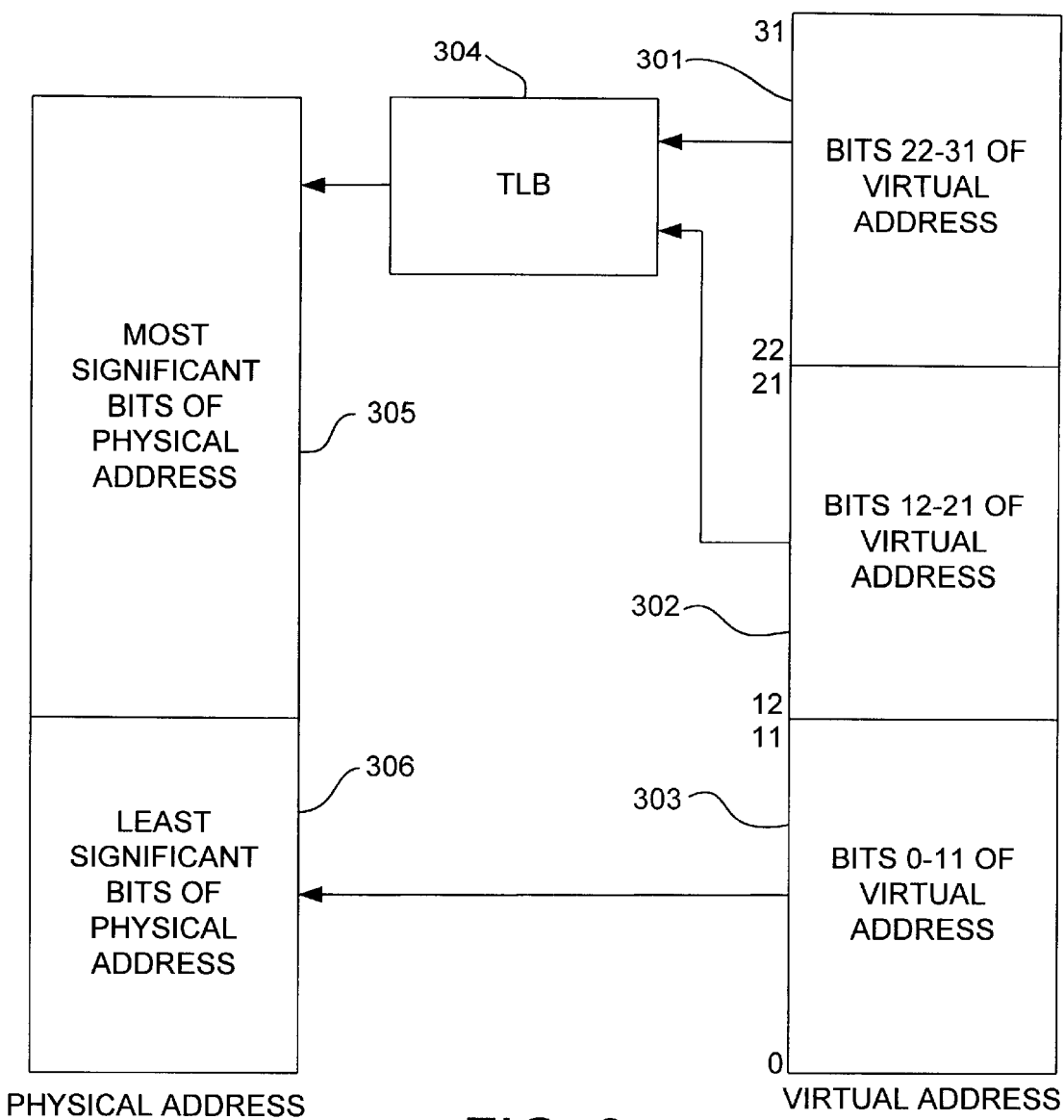
FIG. 3 is a block diagram illustrating an example of a translation lookaside buffer for converting a virtual address to a physical address.

FIG. 3 is a block diagram illustrating an example of a translation lookaside buffer for converting a virtual address to a physical address. A physical address is determined from a virtual address using a TLB. The virtual address comprises a plurality of bits. The bits may be divided into several groups, with each group of bits being used in a specific manner in the determination of the physical address. For example, the ten most significant bits 301 (e.g., bits 22–31 of a 32-bit address) may be passed to TLB 304. The ten next most significant bits 302 (e.g., bits 12–21 of a 32-bit address) may be passed to the TLB 304. The TLB 304 uses the ten most significant bits 301 and the ten next most significant bits 302 of the virtual address to determine the most significant bits 305 of the physical address.

The twelve least significant bits 303 (e.g., bits 0–11 of a 32-bit address) may be used to determine the least significant bits 306 of the physical address without being passed to the TLB 304. Thus, the ten most significant bits 301, the ten next most significant bits 302, and the twelve least significant bits 303 of a 32-bit virtual address may be used to determine a physical address.

Figure 4:
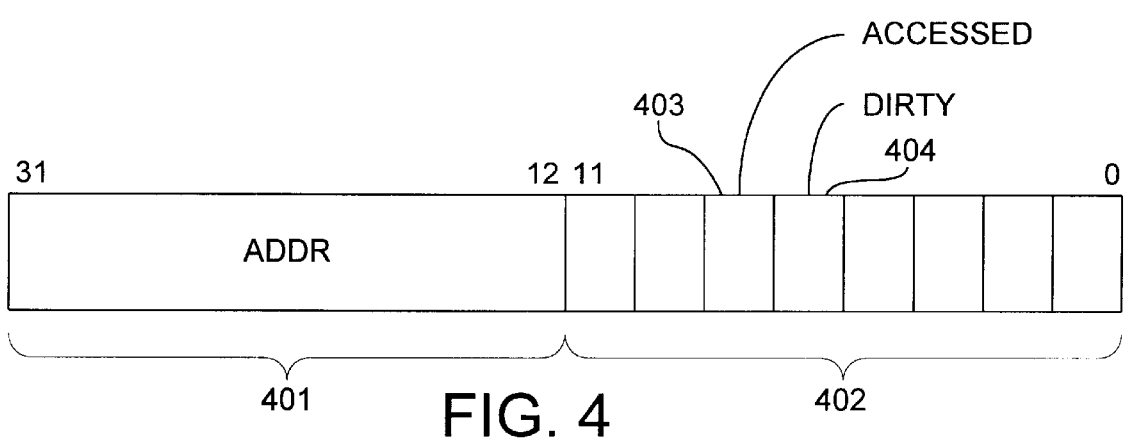
FIG. 4 is a block diagram illustrating a page table entry including bits to indicate the status of the data stored in the translation lookaside buffer.

FIG. 4 is a block diagram illustrating a page table entry including bits to indicate the status of the data stored in the translation lookaside buffer. Both an upper-level page table entry and a lower-level page table entry provide a plurality of bits 401 that may be used to form an address, for, example serving as a pointer to another page table entry or as a pointer to a page in main memory. They also provide additional bits 402 that may be used to indicate the status of the data stored in the translation lookaside buffer. For example, an accessed bit 403 and a "dirty" bit 404 may be included in additional bits 402. The accessed bit 403 may be used to indicate that data in a page to which the page table entry corresponds has been accessed. The first time such data is accessed, the corresponding page table entry is accessed in main memory and loaded into the TLB. Thus, an embodiment of the invention checks the accessed bit at that time, and asserts it if it is not already asserted. The "dirty" bit 404 may be used to indicate that changes have been made to data in a page to which the page table entry corresponds, but the page with the changed data has not been written to main memory.

Figure 5:
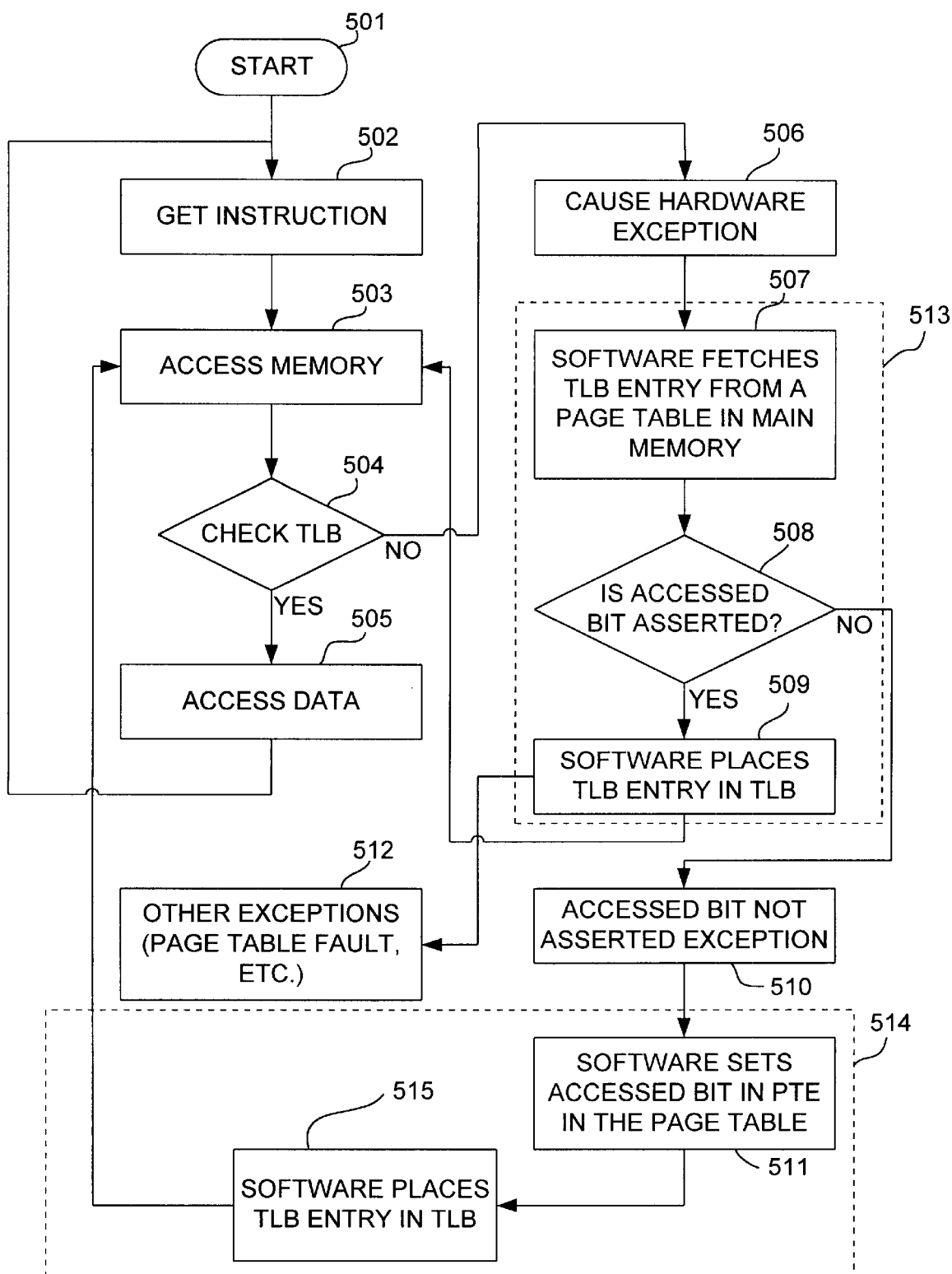
FIG. 5 is a flow diagram illustrating a process according to an embodiment of the invention.

FIG. 5 is a flow diagram illustrating a process according to an embodiment of the invention. The process starts in step 501. In step 502, the process begins execution of an instruction. In step 503, the process begins to attempt to access data stored in memory, for example, data to be used in the execution of the instruction. In step 504, the process checks the TLB to determine if an entry for the desired data exists in the TLB. If an entry exists in the TLB for the desired data, the process accesses the desired data using the entry in the TLB in step 505 and returns to step 502 to begin execution of another instruction.

If an entry for the desired data is not available from the TLB, the process continues in step 506 by causing a hardware exception. A hardware exception is an event that causes a processor to begin execution of an exception handler. The process continues in step 507 with software fetching a page table entry from main memory. In step 508, the process tests whether the accessed bit is asserted in main memory for that page table entry. If the accessed bit is asserted in main memory for that page table entry, software places the page table entry in the TLB in step 509. The process then returns to step 503 unless another exception, such as a page fault exception occurs, in which case the process continues in step 512. Note that steps 507, 508, and 509 are preferably performed according to programmed instructions (software), as indicated by region 513, rather than by dedicated electrical circuits so as to minimize the complexity of the electrical components of the computer system.

If, in step 508, the accessed bit is not asserted in main memory for the page table entry, the process continues in step 510. In step 510, the process causes an "accessed bit not asserted" exception. In step 511, software sets the accessed bit in the page table entry in the page table stored in main memory. Following step 511, the process continues in step 515, where software places the page table entry in the TLB. From step 515, the process returns to step 503. Note that steps 511 and 515 are preferably performed according to programmed instructions (software), as indicated by region 514, rather than by dedicated electrical circuits so as to minimize the complexity of the electrical components of the computer system.

The invention may be practiced according to an embodiment where the steps denoted as being performed by software are performed by software, firmware, and/or microcode embedded in a processor architecture. Any computer usable medium having computer readable program code embodied in the medium may be used. The computer readable program code causes the computer system to perform computer readable program code method steps, such as the steps described above as being performed in software.

The computer system uses electrical circuits, such as those fabricated in an integrated circuit that provides a processor for the computer system, to perform other method steps. The method steps performed by the electrical circuits are referred to as electrical circuit method steps and are also described above.

An embodiment of the invention provides a method for handling an accessed bit in a page table entry while transferring the page table information to a translation lookaside buffer. This method comprises several steps. First, when a page table entry is not present in a TLB, an electrical circuit takes a TLB miss exception and branching to a first software exception handler. Then, the first software exception handler fetches the page table entry from main memory. The first software exception handler places the page table entry in the TLB. An electrical circuit then determines, while (or shortly before or after) the first software exception handler is in the process of placing the page table entry in the TLB, whether an accessed bit of the page table entry has not been asserted. If the accessed bit is asserted, the first software exception handler places the page table entry in the TLB, if it has not already done so, and returns control back to the original memory access, causing execution to resume where it had left off prior to the TLB miss exception.

If the accessed bit is not asserted, an electrical circuit causes an accessed bit exception and branches execution to a second software exception handler. Then, the second software exception handler asserts the accessed bit in the page table entry in main memory. The second software exception handler then returns control back to the original memory access, causing execution to resume where it had left off prior to the TLB miss exception. This process may be practiced for an upper-level page table entry or a lower level page table entry. The accessed bit may be deasserted by operating system software. While the second software exception handler may assert the accessed bit, an electrical circuit may also be used to assert the accessed bit.

Electrical circuits for providing the above may be implemented in a processor or in processor support circuitry using combinational and/or sequential logic devices. Such logic devices can be operatively coupled to a register containing the accessed bit to sense the state of the accessed bit and to the TLB to sense when a TLB miss occurs (e.g., when the page table entry is not present in the TLB).

The first software exception handler and the second software exception handler may be implemented as computer readable program code embodied in a computer usable medium. The first software exception handler can be implemented with computer readable program code to fetch the page table entry from main memory and place the page table entry in the TLB. The second software exception handler can be implemented with computer readable program code to assert the accessed bit in the page table entry in main memory and to return from the exception handling process.

Thus, a method and apparatus for handling an accessed bit in a page table entry is provided.

What is claimed is:

1. An apparatus comprising:
    a main memory;
    a translation lookaside buffer operatively coupled to the main memory and provided with a program of instructions executable by the apparatus to perform method steps for handling an accessed bit in a page table entry, the method steps comprising:
        fetching the information of the page table entry from a main memory;
        placing the information of the page table entry in the translation lookaside buffer structure;
        determining whether the accessed bit has been asserted;
        if the accessed bit has not been asserted, asserting the accessed bit in the page table entry in main memory.

2. The apparatus of claim 1 wherein the method steps further comprise:
    causing a translation lookaside buffer miss exception and branching to a software exception handler.

3. The apparatus of claim 2 wherein the method step of asserting the accessed bit in the page table entry in main memory further comprises the method step of:
    causing an accessed bit exception and branching to a second software exception handler, the second software exception handler asserting the accessed bit in the page table entry in main memory.

4. The apparatus of claim 3 wherein the method steps further comprise:
    resuming execution of a sequence of instructions as preceded the step of causing the translation lookaside buffer miss exception.

5. The apparatus of claim 4 wherein the page table entry is an upper-level page table entry.

6. The apparatus of claim 4 wherein the page table entry is a lower-level page table entry.

7. The apparatus of claim 4 wherein the method step of fetching the information of the page table entry from a main memory is performed by the software exception handler.

8. The apparatus of claim 7 wherein the method step of placing the information of the page table entry in the translation lookaside buffer structure is performed by the software exception handler.

9. The apparatus of claim 8 wherein the step of determining whether the accessed bit has been asserted is performed by an electrical circuit, the electrical circuit operatively coupled to the translation lookaside buffer.

10. An article of manufacture for use in a computer system having a main memory and a translation lookaside buffer for handling an accessed bit in a page table entry, the article of manufacture comprising a computer usable medium having computer readable program code embodied in the medium, wherein the computer readable program code causes the computer system to perform the following computer readable program code method steps:
    fetching information of the page table entry from the main memory;
    placing the information of the page table entry in the translation lookaside buffer structure;
    the computer system comprising an electrical circuit, wherein the electrical circuit performs the following electrical circuit method steps:
        determining whether the accessed bit has been asserted;
        if the accessed bit has not been asserted, asserting the accessed bit in the page table entry in main memory.

11. The article of manufacture of claim 10 wherein the electrical circuit method steps further comprise:
    causing a translation lookaside buffer miss exception and branching to a first software exception handler.

12. The article of manufacture of claim 11 wherein the electrical circuit method step of asserting the accessed bit in the page table entry in main memory further comprises the electrical circuit method step of:
    causing an accessed bit exception and branching to a second software exception handler;
    wherein the second software exception handler asserts the accessed bit in the page table entry in main memory.

13. The article of manufacture of claim 12 wherein the electrical circuit method steps further comprise:
    resuming execution of a sequence of instructions as preceded the step of causing the translation lookaside buffer miss exception.

14. The article of manufacture of claim 13 wherein the page table entry is an upper-level page table entry.

15. The article of manufacture of claim 13 wherein the page table entry is a lower-level page table entry.

16. The article of manufacture of claim 13 wherein the computer readable program code method step of fetching the information of the page table entry from a main memory is performed by the first software exception handler.

17. The article of manufacture of claim 16 wherein the computer readable program code method step of placing the information of the page table entry in the translation lookaside buffer structure is performed by the first software exception handler.

* * * * *